United States Patent
Murabayashi et al.

(10) Patent No.: US 7,647,955 B2
(45) Date of Patent: Jan. 19, 2010

(54) FILLER PIPE ASSEMBLY

(75) Inventors: Shinya Murabayashi, Wako (JP); Shoichiro Kumagai, Wako (JP); Tsuyoshi Chou, Wako (JP); Nobuyuki Kosaka, Wako (JP); Keiichiro Tachisako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 339 days.

(21) Appl. No.: 11/699,259

(22) Filed: Jan. 29, 2007

(65) Prior Publication Data

US 2007/0210607 A1    Sep. 13, 2007

(30) Foreign Application Priority Data

Mar. 9, 2006    (JP) .................. 2006-063578

(51) Int. Cl.
*B65B 1/04*    (2006.01)

(52) U.S. Cl. .............. 141/301; 141/350; 220/86.2

(58) Field of Classification Search ......... 141/301–304, 141/348–350; 220/86.2
See application file for complete search history.

(56) References Cited

U.S. PATENT DOCUMENTS

| 4,747,508 | A | * | 5/1988 | Sherwood | .......... | 220/86.2 |
|---|---|---|---|---|---|---|
| 4,946,060 | A | * | 8/1990 | Sherwood et al. | .......... | 220/86.2 |
| 4,966,299 | A | * | 10/1990 | Teets et al. | .................. | 220/746 |
| 5,035,272 | A | | 7/1991 | Kawase | | |
| 5,040,575 | A | * | 8/1991 | Oeffling et al. | ................ | 141/44 |
| 5,071,018 | A | * | 12/1991 | Moore | ........................ | 220/86.2 |
| 5,960,839 | A | * | 10/1999 | Armesto et al. | ............. | 141/304 |
| 6,415,827 | B1 | * | 7/2002 | Harris et al. | ................. | 141/348 |
| 6,923,224 | B1 | * | 8/2005 | McClung et al. | ............ | 141/350 |

* cited by examiner

*Primary Examiner*—Timothy L Maust
(74) *Attorney, Agent, or Firm*—Carrier, Blackman & Associates, P.C.; Joseph P. Carrier; William D. Blackman

(57) ABSTRACT

In a filler pipe assembly, a holder member secured to an inner wall of a filler pipe is provided with an outer profile of a circular cross section substantially conforming to an inner peripheral wall of the filler pipe and an inner profile defining a bore of a circular cross section eccentric to the outer profile thereof. A relief valve is provided in a part of the holder member defined between the outer profile thereof and the bore owing to an eccentricity of the bore relative to the outer profile. Owing to the eccentric relationship between the outer profile and inner bore of the holder member, a space for a relief valve can be provided in the area where the distance between the inner wall of the bore and the outer profile is the greatest, and this allows the relief valve to be mounted without complicating the structure.

12 Claims, 4 Drawing Sheets

FILLER PIPE ASSEMBLY

TECHNICAL FIELD

The present invention relates to a filler pipe assembly for motor vehicles, and in particular to a filler pipe assembly that provides both a favorable sealing performance and a high durability.

BACKGROUND OF THE INVENTION

The filler pipe of a motor vehicle is typically provided in an inlet box formed by recessing a part of the outer panel of the vehicle body, and is typically fitted with a seal member that engages a filler nozzle when it is placed in the filler pipe for the purpose of preventing the release of fuel vapor to the atmosphere at the time of refueling (see U.S. Pat. No. 5,035,272 (Kawase) issued Jul. 30, 1991). Such a filler pipe is also provided with a relief valve for releasing excess pressure in the filler pipe. For instance, when the filler nozzle is improperly placed in the filler pipe and the level sensor incorporated in the filler nozzle fails to detect the rise of the fuel level, it becomes necessary to release the resulting excess pressure. In the invention disclosed in the aforementioned US patent, a seal lip that serves as such a relief valve is integrally formed with the seal member.

However, according to a conventional structure, the metallic filler nozzle engages the seal surface of the seal member made of elastomeric material and applies a significant load on the seal member. The seal member is required to have a certain rigidity for an improved mechanical strength and wear resistance, but must be pliant enough to achieve a required sealing performance, and it is not possible to meet the two requirements at the same time.

It is also known to provide a relief valve outside the filler pipe separately from the seal member. However, because of a limited space in the filler pipe, there is a significant difficulty in accommodating the necessary components and piping for such a relief valve in the available space. Also, there must be an adequate space or a protective member to prevent the relief valve from damages even at the time of a crash or a rollover. An increase in the number of component parts also adds to the difficulty in ensuring an adequate sealing for fuel vapor.

BRIEF SUMMARY OF THE INVENTION

In view of such problems of the prior art, a primary object of the present invention is to provide a filler pipe assembly that is incorporated with a relief valve while minimizing the number of component parts and the effort required for the assembly work.

A second object of the present invention is to provide a filler pipe assembly which provides both a favorable sealing performance and high durability.

According to the present invention, such objects can be accomplished by providing a filler pipe assembly, comprising; a holder member secured to an inner wall of a filler pipe, the holder member having an outer profile of a circular cross section substantially conforming to an inner peripheral wall of the filler pipe and an inner profile defining a bore of a circular cross section eccentric to the outer profile thereof; a resilient seal member retained by a peripheral wall of the bore and configured to engage an outer periphery of a filler nozzle; and a relief valve provided in a part of the holder member defined between the outer profile thereof and the bore owing to an eccentricity of the bore relative to the outer profile.

Owing to the eccentric relationship between the outer profile and inner bore of the holder member, a space for a relief valve can be provided in the area where the distance between the inner wall of the bore and the outer profile is the greatest, and this allows the relief valve to be mounted without complicating the structure. Preferably, the bracket comprises a first radially inwardly directed flange formed on a fuel tank end thereof, the first radially inwardly directed flange supporting a bottom end of the holder member.

The bracket may further comprise a second radially inwardly directed flange formed on a filler cap end thereof, the holder member being provided with a resilient tab configured to snap engage the second radially inwardly directed flange formed on the filler cap end of the bracket. Thereby, the holder member may be formed as a modular assembly that can be detachably engaged by the bracket mounted in the interior of the filler pipe.

A metallic sleeve may befitted in the bore of the holder member, the sleeve including a bottom end that abuts the first radially inwardly directed flange of the bracket. The sleeve provides an improved durability of the assembly against the loading applied by a fuel nozzle, and an electro-conductive path that is beneficial for preventing electrostatic discharges. If the metallic sleeve further comprises an axial extension, and the first radially inwardly directed flange of the bracket comprises a notch that engages two lateral side edges of the axial extension, the holder member can be prevented from turning around an axial line thereof with a highly simple structure.

If the holder member comprises an outer holder member and an inner holder member that jointly define the outer profile and bore of the holder member, the outer holder member and inner holder member interposing the resilient seal member therebetween and being joined to each other by a snap fit coupling, the resilient seal member can be replaced while allowing the holder member to be used over and over again. If the outer profile of the holder member comprises an annular groove that receives a seal member that engages a surrounding wall surface of the bracket, the sealing of the outer periphery of the holder member can be effected in a simple manner.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
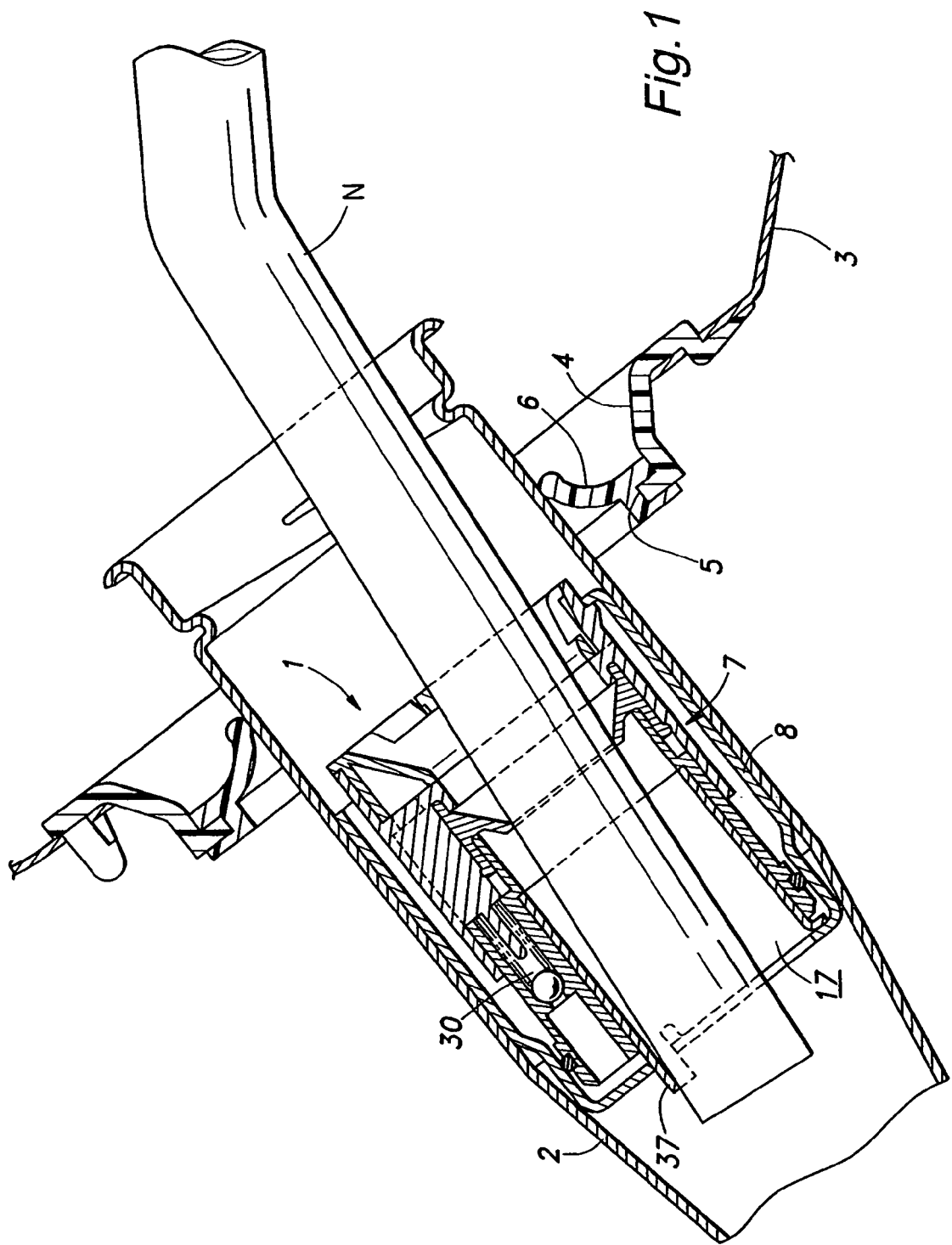
FIG. 1 is a fragmentary sectional view of the filler pipe assembly embodying the present invention.

FIG. 1 shows a filler pipe assembly of a motor vehicle embodying the present invention. This filler pipe assembly 1 comprises a metallic filler pipe 2 extending from a fuel tank not shown in the drawing to an open free end (a filler cap end). The free end of the filler pipe 2 is provided with an outer thread to permit a filler cap not shown in the drawing may be screwed onto and unscrewed from the free end thereof in a conventional manner. The filler pipe 2 extends through an opening 5 of a support plate 4 mounted on a bottom wall of an inlet box 3 formed as a recessed part of the outer panel of the vehicle body, and is fixed in position by a grommet 6 which is fitted on the inner peripheral edge of the opening 5 of the support plate 4 and engages the outer periphery of the filler pipe 1. In the filler pipe 2 is received a filler pipe module 7 for receiving a filler nozzle N in a liquid tight manner.

Figure 2:
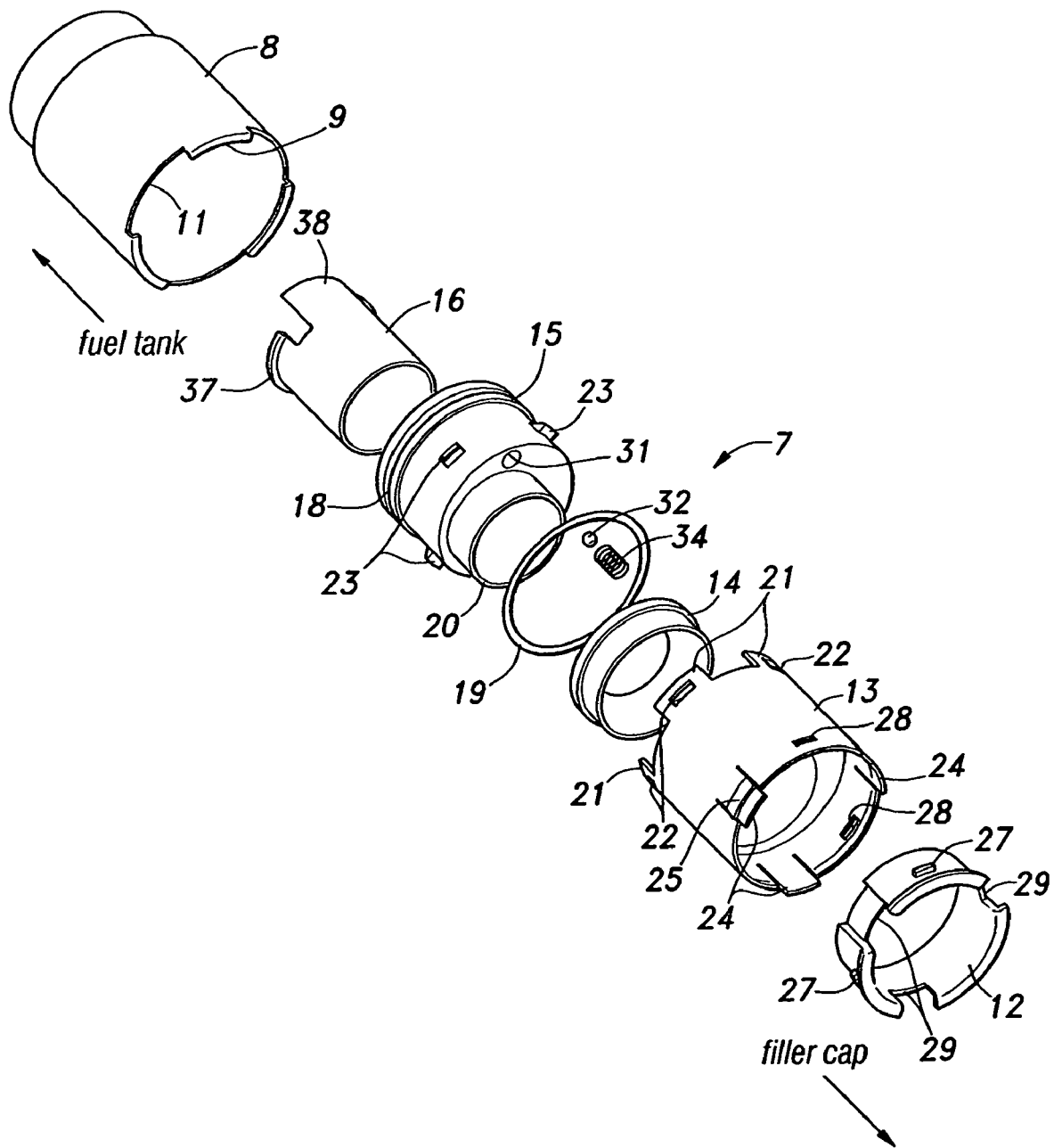
FIG. 2 is an exploded perspective view of the filler pipe assembly.
Figure 3:
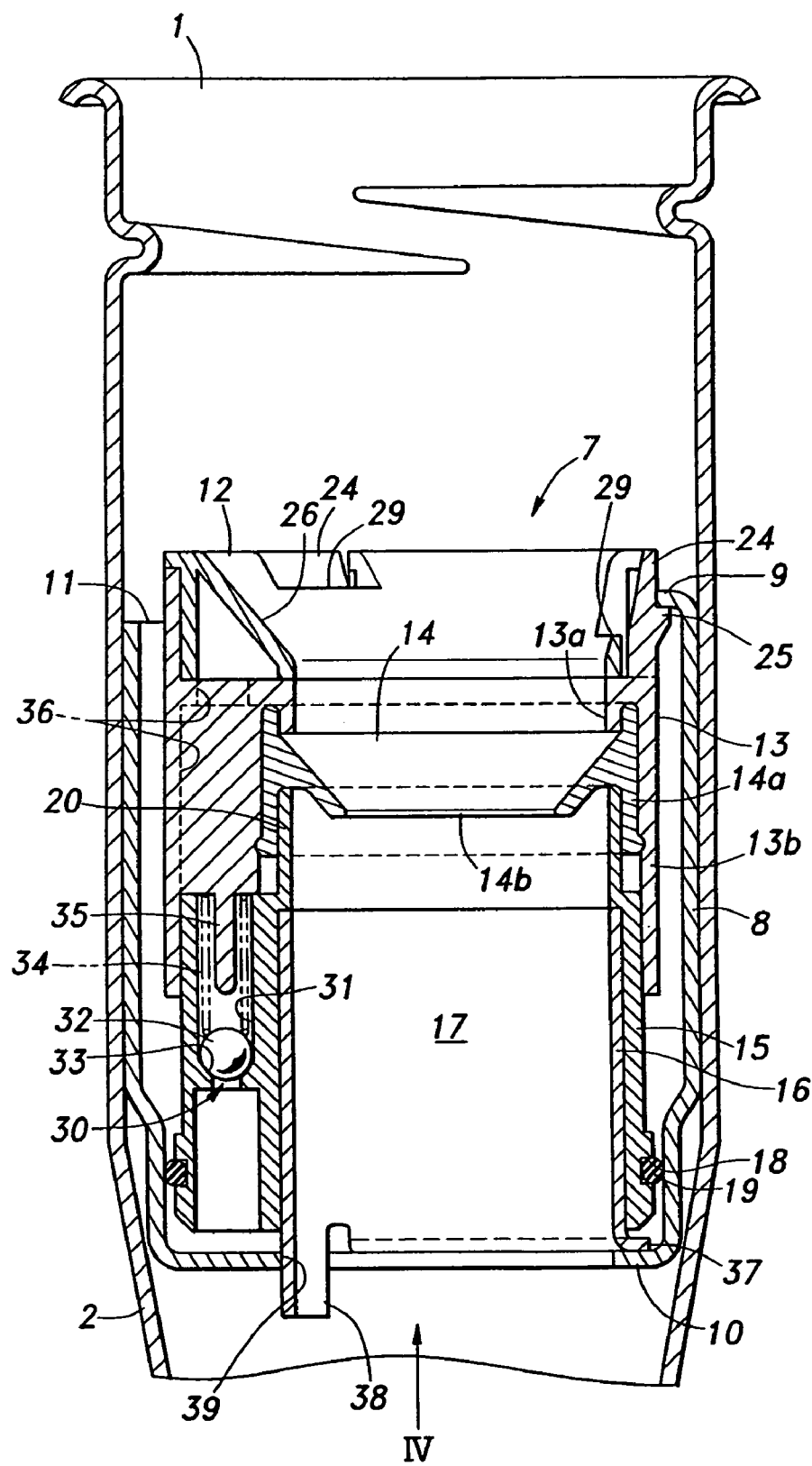
FIG. 3 is an enlarged section view of the filler pipe assembly.
Figure 4:
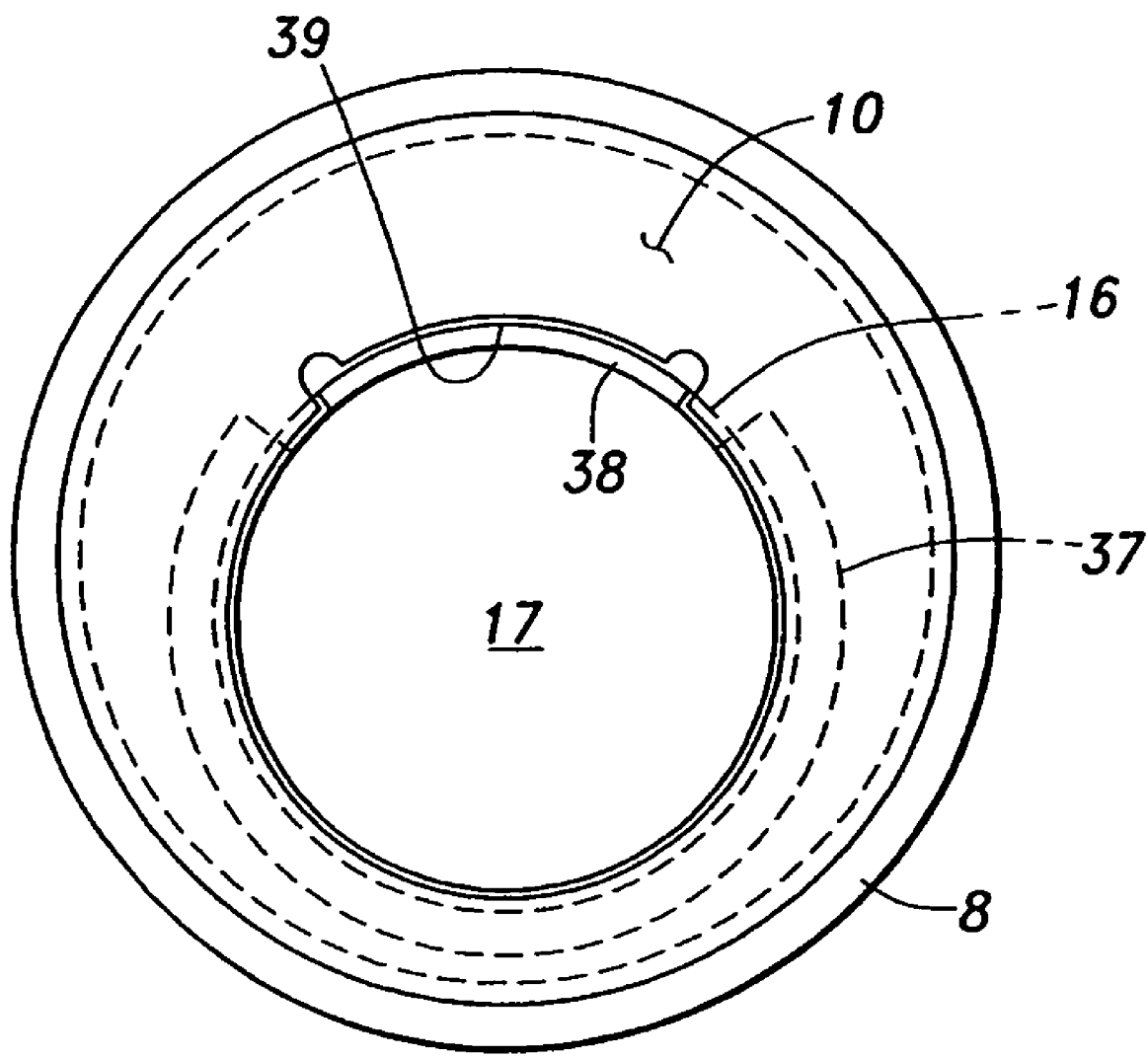
FIG. 4 is a bottom view of the filler pipe assembly as seen from the direction indicated by an arrow IV.

As shown in FIGS. 2 and 3 also, the filler pipe module 7 is detachably mounted on a bracket 8 which is made of stamp formed stainless steel plate and welded to the inner wall of the filler pipe 2. The bracket 8 consists of a cylindrical member which is slightly tapered toward the fuel tank end thereof. Each axial end of the bracket 8 is formed with a radially inwardly directed flange 9, 10. The flange 9 on the filler cap end of the bracket 8 is provided with three notches 11 that are formed by circumferentially dividing the correspond end of the bracket 8 into six equal parts and trimming off every second part thereof.

The filler pipe module 7 comprises a nozzle guide member 12, outer holder member 13, elastic seal member 14, inner holder member 15 and sleeve 16. These five component parts are assembled one after another from the filler cap end in that order. The filler pipe module 7 is provided with an outer profile having a truly circular cross section and conforming to the inner peripheral surface of the filler pipe 2 or the bracket 8 when the filler pipe module 7 is fitted in the filler pipe 2 in the assembled state leaving a very small gap therebetween. The hollow interior of the filler pipe module 7 is also provided with a truly circular cross section but is significantly eccentric in relation to the outer profile thereof. In particular, the center of the inner profile of the filler pipe module 7 is downwardly offset in relation with the center of the outer profile of the filler pipe module 7.

The inner holder member 15 that is located in the fuel tank end of the filler pipe module 7 is made of hard plastic material, and provided with a circular outer profile conforming to the inner peripheral wall of the bracket 8 and an eccentric circular inner profile. A cylindrical sleeve 16 made of stainless steel is fitted into the inner profile to define a bore 17 for receiving a filler nozzle N. The outer circumferential surface of the fuel tank end of the inner holder member 15 is provided with an annular groove 18 that receives an O-ring 19. The O-ring 19 ensures a liquid tight seal between the filler pipe module 7 and surrounding wall of the bracket 8. The inner holder member 15 further comprises an axial collar 20 that extends toward the fuel cap end and internally defines an extension of the bore 17 of the cylindrical sleeve 16.

On the axial free end of the axial collar 20 is fitted an elastic seal member 14 which is made of a relatively soft elastomeric material, and comprises a tubular portion 14a fit on the outer periphery of the axial collar 20 and an annular lip 14b that extends obliquely from the inner wall of the tubular portion 14a toward the fuel tank end and rests upon the free end of the axial collar 20. When the filler nozzle N is placed in the bore 17, the annular lip 14b bears upon the outer periphery of the filler nozzle N, and establishes a liquid tight seal jointly with the outer surface of the filler nozzle N.

The outer holder member 13 is provided with an outer wall that fits onto the outer profile of the inner holder member 15 and the tubular portion 14a of the elastic seal member 14. The inner profile of the outer holder member 13 defines an extension of the bore 17. More specifically, the inner profile is provided with a hook-like extension as seen in the sectional view that hugs the corresponding axial end of the tubular portion 14a of the elastic seal member 14. The inner peripheral wall of the outer holder member 13 comprises an annular groove that receives a bead formed in the fuel tank end of the elastic seal member 14. The fuel tank end of the outer holder member 13 is provided with four tabs 21 extending in the axial direction and each formed with a rectangular opening 22. The outer circumferential surface of the inner holder member 15 is formed with four projections 23 that are circumferentially distributed at a regular interval. By snap fitting the projections 23 into the corresponding openings 22 by utilizing the resiliency of the tabs 21, the inner and outer holder members 15 and 13 are attached to each other with the elastic seal member 14 interposed between.

The fuel cap end of the outer holder member 13 is provided with three tabs 24 that are separated from the adjoining parts by axial slits, and each tab 24 is provided with a projection 25 on an outer surface thereof. The remaining part of the fuel cap end of the outer holder member 13 is provided three rectangular openings 28 distributed at a regular angular interval. The nozzle guide member 12 is made of plastic material, and is provided with three projections 27 distributed at a regular interval on an outer periphery thereof. The nozzle guide member 12 is fitted into the fuel cap end of the outer holder member 13, and is held in position by the projections 27 snap fitting into the corresponding openings 28 of the outer holder member 13 owing to the resiliency of the filler cap end of the outer holder member 13 and/or the nozzle guide member 12. The nozzle guide member 12 is provided with three axial slots 29 on an outer circumferential surface thereof at a regular interval to receive the corresponding tabs 24 therein. The hollow interior of the nozzle guide member 12 is smooth and slightly tapered so as to favorably guide the filler nozzle N.

The projections 25 of the tabs 24 on the filler cap end of the outer holder member 13 are configured to be resiliently engaged by the radially inwardly directed flange 9 owing to the resiliency of the tabs 24.

The fact that the inner profile jointly defined by the inner and outer holder members is offset relative to the outer profile thereof creates a space at a corresponding circumferential position, and a relief valve 30 is provided in this space. The relief valve 30 comprises an axial hole 31 formed in the inner holder member 15, a valve seat 33 formed in an intermediate part of the axial hole 31, a ball 32 received in this axial hole 31 and a compression coil spring 34 received in the axial hole 32 and having one end engaged by a spring support portion 35 provided in the outer holder member 13 and another end urging the ball 32 against the valve seat 33. A relief passage 36 is defined in a part of the outer holder member 13 adjacent to the spring support portion 35 to communicate the interior of the inner holder member 15 and the exterior of the nozzle guide member 12 via the axial hole 31. The filler cap end of the relief passage 36 opposes the tapered wall surface 26 of the nozzle guide member 12.

In this relief valve 30, the ball 32 is normally urged against the valve seat 33 under the spring force of the compression coil spring 34. However, when the inner pressure of the filler pipe 2 exceeds a certain level, the inner pressure pushes the ball 32 away from the valve seat 33 against the spring force of the compression coil spring 34, and the fuel tank end and filler cap end of the filler pipe module 7 communicate with each other even when a filler nozzle N is placed in the bore 17, and the fuel that applied the pressure to the ball 32 is permitted to flow to the filler cap end of the filler pipe 2. In such a case, because the open end of the relief passage 36 opposes the inner wall of the nozzle guide member 12, the fuel would not gush out from the filler pipe 2 to the outside.

The fuel tank end of the metallic sleeve 16 is formed with a radially outwardly directed flange 37 that rests upon the opposing flange 10 on the fuel tank end of the bracket 8, and an axial extension 38 extends from an upper part of the fuel tank end of the metallic sleeve 16. The flange 10 on the fuel tank end of the bracket 8 defines a center opening which is concentric with respect to the center of the bore 17, and an upper part of the inner periphery thereof is provided with a notch 39 for engaging the lateral side edges of the axial extension 38 of the sleeve 16 against rotation.

When installing the filler pipe module 7, the filler pipe module 7 is pushed into the filler pipe 2 from the filler cap end thereof, and the tabs 24 is caused to resiliently deform inwardly until the projections 25 thereon are engaged by the flange 9 of the filler cap end of the bracket 8. At the same time, the radial flange 37 of the sleeve 16 abuts the radially inwardly directed flange 10 on the fuel tank end of the bracket 8 to thereby secure the filler pipe module 7 against axial displacement. The notch 39 formed in the inner periphery of the fuel tank end flange 10 of the bracket 8 engages the lateral edges of the axial extension 38, and the filler pipe module 7 is thereby circumferentially fixed in position.

When a filler nozzle N is placed in the filler pipe 2, owing to the action of the gravity, the free end of the filler nozzle N abuts the axial extension of the sleeve 26 so that the filler nozzle N is electrically connected to the vehicle body via the sleeve member 26 and electrostatic discharge can be avoided. Also, because the load of the filler nozzle N is supported by the sleeve 16, the annular lip 14b of the resilient seal member 14 is protected from excessive load, and this ensures a high durability of the resilient seal member 14.

When the filler pipe module 7 is desired to be removed, the tabs 24 are inwardly flexed by using a tool such as a screwdriver to disengage the projections 25 from the flange 9. The filler pipe module 7 can be then removed from the filler pipe 2. Thus, the filler pipe module 7 can be installed and removed over and over again without any difficulty.

The two holder members 13 and 15 may be separated from each other simply by flexing the axial tabs 21 of the outer holder member 13 so as to disengage the projections 23 from the corresponding openings 22. Therefore, if necessary, the resilient seal member 14 may be replaced while the remaining components may be used once again.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A filler pipe assembly, comprising;
a holder member secured to an inner wall of a filler pipe, the holder member having an outer profile of a circular cross section substantially conforming to an inner peripheral wall of the filler pipe and an inner profile defining a bore of a circular cross section eccentric to the outer profile thereof;
a resilient seal member retained by a peripheral wall of the bore and configured to engage an outer periphery of a filler nozzle;
a relief valve provided in a part of the holder member defined between the outer profile thereof and the bore owing to an eccentricity of the bore relative to the outer profile; and
a metallic tubular bracket fixedly attached to an inner wall of the filler pipe, the bracket comprising a first radially inwardly directed flange formed on a fuel tank end thereof, the first radially inwardly directed flange supporting a bottom end of the holder member.

2. The filler pipe assembly according to claim 1, wherein the bracket further comprises a second radially inwardly directed flange formed on a filler cap end thereof, the holder member being provided with a resilient tab configured to snap engage the second radially inwardly directed flange formed on the filler cap end of the bracket.

3. The filler pipe assembly according to claim 1, further comprising a metallic sleeve fitted in the bore of the holder member, the sleeve including a bottom end that abuts the first radially inwardly directed flange of the bracket.

4. The filler pipe assembly according to claim 3, wherein the metallic sleeve further comprises an axial extension and the first radially inwardly directed flange of the bracket comprises a notch that engages two lateral side edges of the axial extension.

5. The filler pipe assembly according to claim 1, wherein the holder member comprises an outer holder member and an inner holder member that jointly define the outer profile and bore of the holder member, the outer holder member and inner holder member interposing the resilient seal member therebetween and being joined to each other by a snap fit coupling.

6. The filler pipe assembly according to claim 1, wherein the outer profile of the holder member comprises an annular groove that receives a seal member that engages a surrounding wall surface of the bracket.

7. A filler pipe assembly for a filler pipe of a motor vehicle, comprising;
a holder member configured to be secured to an inner wall of the filler pipe, the holder member having an outer profile of a circular cross section substantially conforming to an inner peripheral wall of the filler pipe and an inner profile defining a bore of a circular cross section eccentric to the outer profile thereof;
a resilient seal member retained by a peripheral wall of the bore and configured to engage an outer periphery of a filler nozzle;
a relief valve provided in a part of the holder member defined between the outer profile thereof and the bore owing to an eccentricity of the bore relative to the outer profile; and
a metallic tubular bracket fixedly attached to an inner wall of the filler pipe, the bracket comprising a radially inwardly directed flange formed on a filler cap end thereof, the holder member being provided with a resilient tab configured to snap engage the radially inwardly directed flange formed on the filler cap end of the bracket.

8. The filler pipe assembly according to claim 7, wherein the metallic tubular bracket further comprises another radially inwardly directed flange formed on a fuel tank end thereof, the radially inwardly directed flange formed on a fuel tank end of the metallic tubular bracket supporting a bottom end of the holder member.

9. The filler pipe assembly according to claim 8 further comprising a metallic sleeve fitted in the bore of the holder member, the sleeve including a bottom end that abuts the radially inwardly directed flange formed on a fuel tank end of the metallic tubular bracket.

10. The filler pipe assembly according to claim 9, wherein the metallic sleeve further comprises an axial extension and the radially inwardly directed flange formed on a fuel tank end of the metallic tubular bracket comprises a notch that engages two lateral side edges of the axial extension.

11. The filler pipe assembly according to claim 7, wherein the holder member comprises an outer holder member and an inner holder member that jointly define the outer profile and bore of the holder member, the outer holder member and inner holder member interposing the resilient seal member therebetween and being joined to each other by a snap fit coupling.

12. The filler pipe assembly according to claim 8, wherein the outer profile of the holder member comprises an annular groove that receives a seal member that engages a surrounding wall surface of the bracket.

* * * * *